May 5, 1959

M. R. HILLEMAN ET AL 2,884,936

MECHANICAL TISSUE CULTURE WASHER

Filed June 13, 1956

INVENTORS
MAURICE R. HILLEMAN
RICHARD O. TAYLOR
BY

ATTORNEYS

May 5, 1959  M. R. HILLEMAN ET AL  2,884,936
MECHANICAL TISSUE CULTURE WASHER
Filed June 13, 1956  3 Sheets-Sheet 2
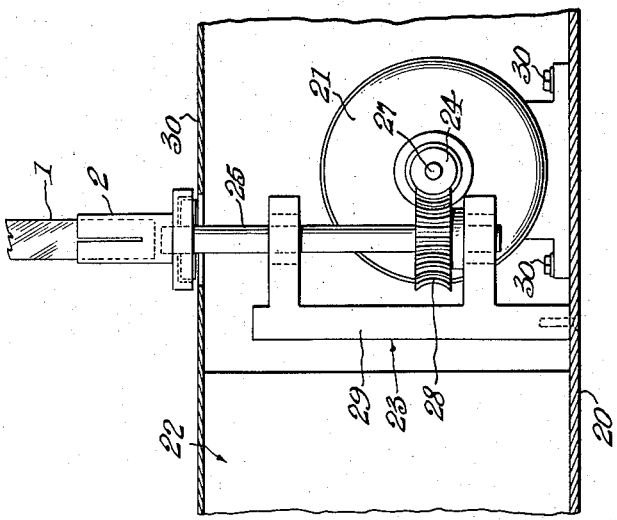
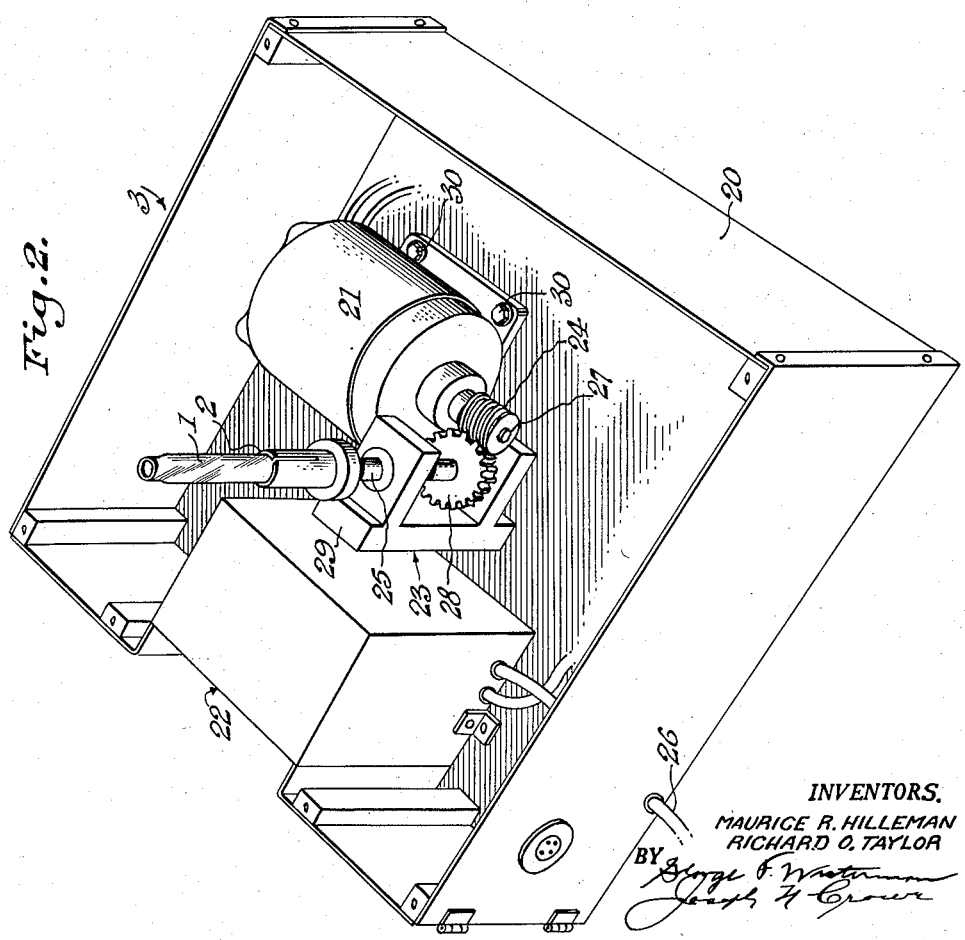
INVENTORS.
MAURICE R. HILLEMAN
RICHARD O. TAYLOR
BY
ATTORNEYS.

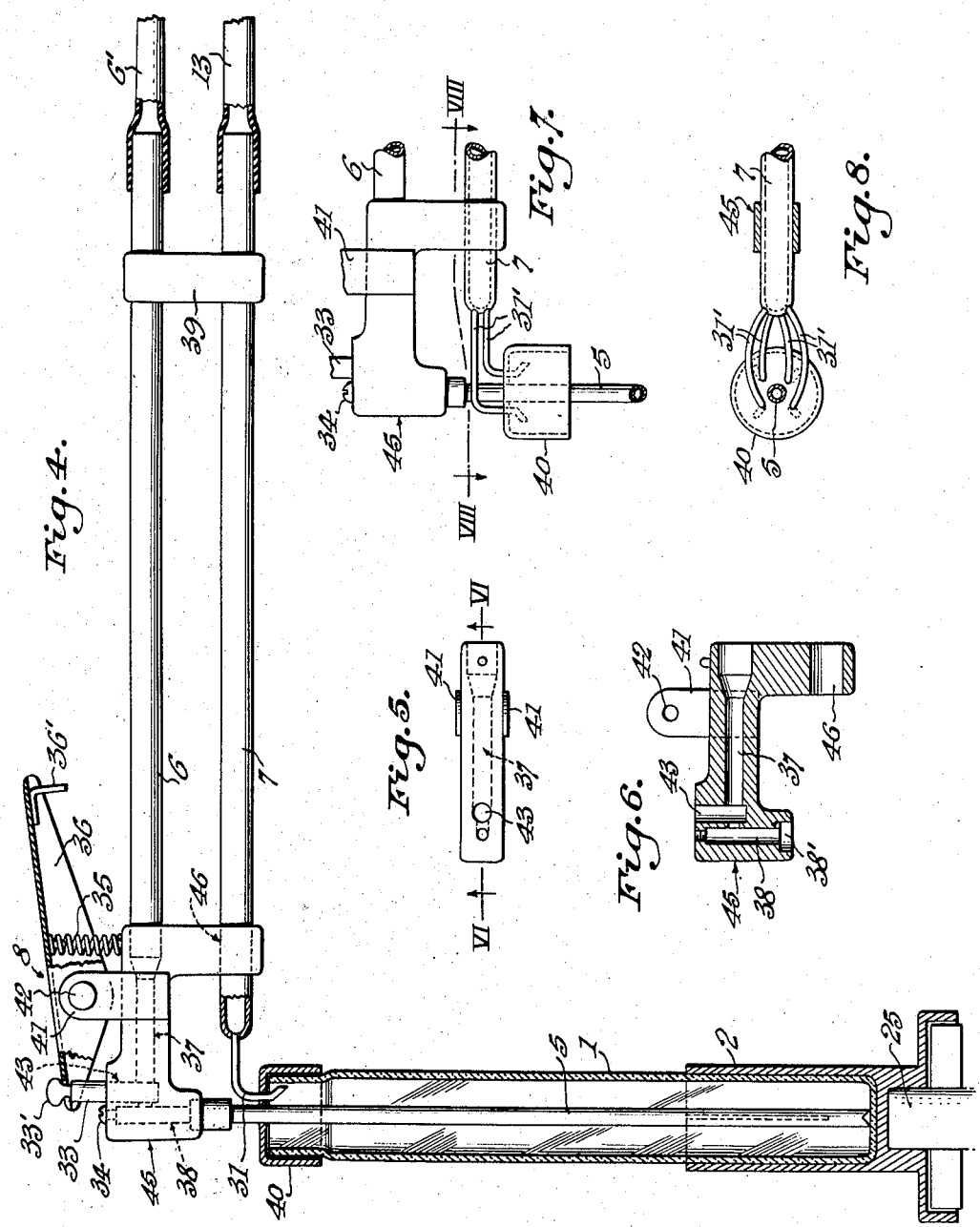

United States Patent Office 2,884,936
Patented May 5, 1959

2,884,936

MECHANICAL TISSUE CULTURE WASHER

Maurice R. Hilleman, Bethesda, and Richard O. Taylor, Greenbelt, Md., assignors to the United States of America as represented by the Secretary of the Army Application June 13, 1956, Serial No. 591,255

3 Claims. (Cl. 134—148)

(Granted under Title 35, U.S. Code (1952), sec. 266)

The invention described herein may be manufactured and used by or for the Government for governmental purposes without the payment of any royalty thereon.

The present invention relates to laboratory apparatus and more particularly to a laboratory apparatus for the washing of tissue cultures.

In the study of bacteria and viruses, human and animal tissues are being utilized with increasing frequency as culture media. Often, large numbers of such cultures must be treated expeditiously. Tissue cultures, which consist of cells of human, animal, or plant origin, are grown, in vitro, in nutritive solution. For cultivation of cells, serum is usually a component of the nutrient solution. This serum may contain antibodies against the viruses or bacteria to be studied in such cultures. The nutrient solution consequently often contains antibodies and other antivirul or anti-bacterial substances which adversely affect the growth of the virus or bacteria desired to be studied. In order for the desired bacterial or virus to be grown in the absence of antibodies, the nutrient solution must first be substantially completely removed. To remove such solution from the tissue culture, the culture is washed with a wash fluid which is free of nutrients, hence, of antibodies. To take the place of the nutrient solution after its removal, as a preservative of the tissue culture, a maintenance fluid, free of antibodies against the virus or bacteria to be studied, is introduced into the holder containing the tissue. Finally, the bacteria or virus is introduced into the tube.

The washing of the tissue culture must be so thorough as to insure that there would not remain with the tissue culture sufficient anti-virul or anti-bacterial substances, such as antibodies, as to affect the growth of the desired bacteria or viruses. This is difficult, as these cultures grow adherent to the walls of the culture tube. The cultures may also be grown upon slides, fibrin or other form, or other material contiguous with the tube walls. Prior to the present invention, tissue cultures were washed free from their nutrient solution by hand. The tissue cultures in their test tubes were separated from their nutrient by sucking or pouring the nutrient from the tube. A wash fluid was then introduced into the tube. The tube was gently swirled, and the wash fluid sucked or poured out. This entire sequence of manual steps was repeated a sufficient number of times, usually two or three, so that substantially complete removal of the serum was effected. By hand methods, with three changes of wash fluid, only 30 tubes could be washed by one person in one hour. In addition, when the swirling action was not sufficiently gentle, the cells which were growing on the inner tube surface were damaged.

Briefly, in accordance with this invention, tissue culture is grown on or contiguous to the walls of a tube having an opening at the top. The nutrient solution is removed by an aspirator through the top opening. Wash fluid is then introduced by a "Vacujet" apparatus at the top opening, and continuously removed by the aspirator. The tube is rotated, during the continuous washing action, by means of a variable speed turntable. Finally, maintenance fluid is added to the tube.

From the foregoing, it may be said to be an object of the present invention that tissue cultures be rapidly washed free from their nutrient.

A further object of this invention is to provide laboratory equipment which rapidly washes nutrients from tissue culture without manual handling.

A still further object of this invention is to provide laboratory apparatus which washes tissue cultures without contaminating the cultures with bacteria or other contaminants.

Yet another object of this invention is to provide laboratory apparatus which completely bathes all parts of tissue cultures without damage to the culture cells.

A further object of this invention is to provide apparatus which enables tissue cultures to be continuously bathed by a wash fluid without damage to the tissue cells.

A still further object of this invention is to provide apparatus for treating tissue cultures with a fluid so that substantially all the cells of the culture are in contact with the fluid.

In the accompanying drawings—

Fig. 2 is a top perspective view of the turntable component of the right hand end of the complete assembly as viewed in Fig. 1 with the cover removed;

Fig. 3 is a fragmentary longitudinal sectional elevation of the motor and gear assembly;

Fig. 4 is a fragmentary longitudinal sectional elevation of the "Vacujet" apparatus taken through a portion of the right hand end of the complete assembly as viewed in Fig. 1;

Fig. 5 is a plan view of the "Vacujet" head;

Fig. 6 is a vertical section of the "Vacujet" head as viewed in Fig. 5, the view being generally along the line VI—VI, the vertical center of Fig. 5, looking in the direction of the arrows. This figure illustrates the head portion of the "Vacujet" apparatus cut away to show the internal channels of the jet and the aspirator with its associated valve mechanism;

Figure 1:
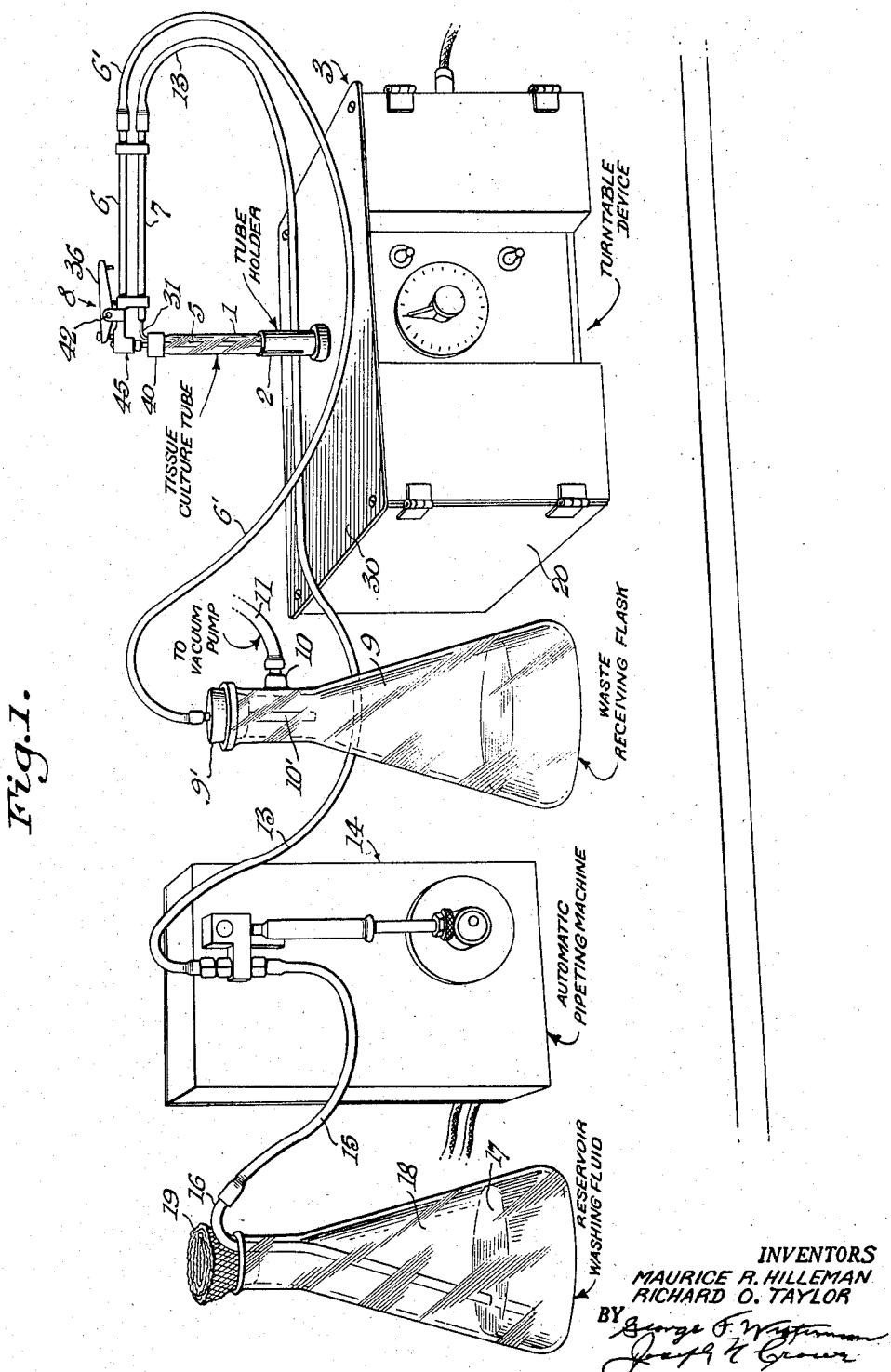
Fig. 1 is a perspective view of a complete assembly consisting of the novel laboratory apparatus of the present invention operatively positioned so as to provide continuous washing action.

In Fig. 7, an alternative form of a "Vacujet" apparatus is illustrated in a longitudinal and fragmentary elevation. This alternative construction is of the left and upper portion of the "Vacujet" apparatus as viewed in Fig. 4; and Fig. 8 is a fragmentary top sectional elevation of the head portion of the alternative construction of the "Vacujet" apparatus as viewed in Fig. 7, the view being generally along the longitudinal center line VIII—VIII of Fig. 7, looking in the direction of the arrows.

In Fig. 1 the components of the laboratory apparatus of this invention are arranged in the washing stage. To effect washing, tissue culture is grown on or contiguous to the walls of a tissue holding tube 1 in a nutrient fluid. Generally this is a common laboratory test tube. The test tube 1 is fitted into the milled tube holder 2. This tube holder 2 is mechanically connected to a rotation driving mechanism within the turntable device 3. Then the complete "Vacujet" apparatus shown best in Fig. 4 is placed so that the tube 5 extending from the aspirator hose projects down into the tissue culture tube 1, preferably projecting near to its bottom. The "Vacujet" apparatus consists of an aspirator tube 6, a jet or pressurized liquid tube 7, and a valve control 8 for the aspirator. Nutrient solution which surrounds the tissue when in the growth stage within tube 1, is removed from the tissue culture within the tube by the aspirator tube 5. This aspirator tube is connected to an aspirator hose 6', which is generally flexible for convenience. Aspirator hose 6' leads to the waste receiver flask 9 through air tight stopper 9' and waste receiving flask tube 10'. The pressure within the waste flask 9 is maintained below that of the prevailing atmospheric pressure in order to create a partial vacuum to the aspirating tube 5. An outlet 10 is provided to the waste flask 9 to which is connected a standard vacuum pump, not shown, by means of flexible hose 11.

After the nutrient is substantially removed, the tissue culture is ready for washing. The pressurized liquid tube 7 is opened allowing a jet stream of washing fluid to enter tissue holding tube 1. Pressurized liquid tube 7 delivers the washing fluid to the jet head by means of pressurized liquid hose 13, which is generally flexible for convenience. Hose 13 is connected at its receiving end to an automatic pipetting machine 14. This pipetting machine 14 is, in effect, a pump to force the washing fluid under pressure into hose 13. A suitable pipetting machine, as illustrated, gives pressure which is discontinuous. Other pump or pressure means may, of course, be utilized. The illustrated pipetting machine 14 is automatic and gives the desired number of pressure periods or spurts in a given time period. Pipetting machine 14 receives the washing fluid from hose 15 which is connected to tube 16. Tube 16 is led into the washing fluid 17 in flask 18. To prevent contamination, a closure 19 in flask 18 is provided.

In the washing stage, washing fluid 17 is drawn from flask 18 by means of tube 16 and hose 15. The fluid is put under pressure by the pipetting machine 15 and is forced into hose 13 and pressure tube 17. The fluid is released as a jet stream into test tube 1 washing the tissue culture. At the same time, aspirator tube 5 sucks the washing fluid out near the bottom of tube 1. The used and possibly contaminated washing fluid is drawn by reduced pressure through aspirator tube 5, hose 6', and waste receiving flask tube 10', into the waste receiving flask 9. Contemporaneously with this continuous washing action, tissue holder tube 1 is rotated about its vertical axis by means of tube holder 2 and turntable 3. The combination of continuous jet washing and rotation effects substantially complete removal from the tissue culture of undesired antibodies within a much shorter period than is possible by hand methods.

In Fig. 2 the turntable 3 illustrated at the right hand end of Fig. 1 is shown in sectional view. This turntable 3 rotates the tissue tube holder 2 to insure that the washing fluid 17 rapidly reaches all portions of the tissue culture. Turntable 3 consists principally of a mounting case 20, a motor 21, control means 22 to vary the speed as well as start and stop the motor, and gearing means 23, by which the motor 21 rotates the tissue tube holder 2, and thereby rotates the tissue culture tube 1.

The mounting case 20 is preferably of a non-rusting metal in order that the apparatus may be steam sterilized. As an example of a workable turntable, the mounting case 20 is of aluminum, the motor 21 utilized in one-fifth horsepower direct current, the motor control means 22 a variable resistance and an on-off switch, and the gearing means 23 consists of reducing worm gear 24 mounted on the armature shaft 27 of motor 22 and geared to a gear 28 on a shaft 25 connectable with the tissue tube holder 2. The tissue tube holder is also preferably of non-rusting metal and is slotted to provide a frictional contact with the particular size of tissue culture tube 1 employed. Electrical connection of the motor control 22 and switch to the current source is provided by wire 26, which leads through the mounting case 20 to the motor control unit 22 and then to the motor 21 and finally again through the mounting case 20 returning to the electrical power source.

Fig. 3 shows in greater detail the power train in turntable 3 utilized to rotate the tissue culture tube 1 during washing. In a mounting case 20 an electric motor 21 is mounted by conventional bolts 30. In the armature shaft 27 of this motor a reducing worm gear 24 is connected. This worm gear 24 imparts the rotary motion about the horizontal axis of the motor 21, by means of meshing with gear 28, into the rotary motion of vertical shaft 25. Gear 28 is connected to shaft 25. The vertical shaft 25 rotates within a vertical shaft mount 29 which is secured to mounting case 20. Shaft 25 projects through the top cover 30 of mounting case 20. At the butt end of shaft 25 projecting above top cover 30 the tissue tube holder 2 is connected to shaft 25. Various sizes of holders 2 may be employed depending upon the size of the tissue culture tube 1.

In Fig. 4, illustrating the "Vacujet" apparatus shown as a portion of the right hand end of the assembly as viewed in Fig. 1, the tissue tube holder 2 is shown as connected on the butt end of shaft 25.

Upon rotation of shaft 25, tissue tube holder 2 and tissue tube 1 rotate around their vertical axis. The "Vacujet" apparatus is so constructed as to permit this rotation. In particular, the aspirator tube 5 projects into the tissue tube 1 when in the operating position so that the center of the aspirator tube is approximately at the central vertical axis of rotation of the tissue tube 1. In addition, the tip of the jet tube 31 projects into the tissue tube 1 at the top of the tissue tube thereby not disturbing the tissue culture during rotation. The cap 40 of the tissue tube 1 is an integral part of the "Vacujet" apparatus. Both the aspirator tube 5 and the top of the jet tube 31 project through cap 40.

Aspiration is accomplished by opening valve means 8 which is situated between the aspirator tube 6 connected to aspirator hose 6' and the aspirator tube 5 within tissue tube 1. Valve means 8 consists of the "Vacujet" head 45, the valve arm 36, bracket 41, valve 33, spring 35, and cleaning plug 34. "Vacujet" head 45 has channels 37 and 38 for the aspirated, and channel 46 for the pressurized fluids. Valve 8 is arranged so as to be normally closing aspirator channel 37. To aspirate, valve 33 is elevated by means of depressing valve arm 36. Valve arm 36, acting as a lever, turns on pivot 42 which is supported on valve arm bracket 41. Valve arm 36 is limited in its depression movement by stop 36'. In depressing valve arm 36, the spring 35 between the valve arm and the "Vacujet" head 45 is compressed. Upon release of valve arm 36, spring 35 expands, elevating the right end of the valve arm. This, in turn, causes valve 33, which is connected to valve arm 36 by screw 33', to be depressed into its normal position in valve channel 43. The aspiration action is thereby terminated by the closing of aspirator channel 37.

The jet tube 7 is supported by bracket 39 and aspirator head 45. The jet or pressure flow of washing fluid is not controlled by valve means 8 but rather is controlled by the automatic pipetting machine 14.

The channel construction of the "Vacujet" head 45 is seen more clearly by reference to Fig. 5, a plan view of the head 45, in which the aspirator tube is fitted and soldered into the opening of channel 37. For sterilization, all metal parts of this laboratory apparatus including the tubes and brackets are preferably of stainless steel and silver solder utilized for all connections. The vertical openings into the head are valve channel 43 into which valve 33 is fitted, and channel 38 into which cleaning plug 34 is inserted.

The various channels of head 45 may also be viewed in Fig. 6 which is a side sectional view of head 45. The aspirator tube channel 37 is shown as being horizontally positional and continuing through valve channel 43, then making a right angle and continuing to the aspirator tube 5 opening 38'. Aspirator tube 5 is vertically aligned with the cleaning plug channel 38. Aspirator channel 37 is horizontal and is parallel to the jet (pressure) channel 46. Bracket 41 is shown as extending beyond the top of head 45.

An alternative form of "Vacujet" head 45 is illustrated in Figs. 7 and 8. The single tip of the jet tube 31 is replaced by a plurality of tips designated 31'. The structure is otherwise the same as in the previous illustrations except that cap 40 is provided with openings corresponding to the additional number of jet tips 31'. It should be noted that in all instances, the jet tips 31 and 31' slant away from the aspirator tube 5 and toward the walls of the tissue tube 1. By means of this slant in the jet tips 31 and 31' the pressurized washing fluid is directed against the walls of the tissue tube 1 insuring a more thorough washing action.

The apparatus as illustrated in Figs. 7 and 8, utilizing a plurality of jet tips 31', will wash tissue cultures without rotation of the tissue tube 1. Washing without rotation and with multiple jet tips is not as efficient as such washing with rotary motion. However, this alternative structure employing multiple jet tips may be employed where the antibody level in the body fluid is not high. The multiple jet tip structure is especially useful where large numbers of tissue cultures are to be washed simultaneously. The greatest washing efficiency is attained by utilizing the plurality of jet heads 31' and rotation of the tissue tube 1 during the washing action.

Having thus described our invention, what we claim as new and wish to secure by Letters Patent is:

1. Apparatus for washing tissue cultures grown on the inner wall of an elongated cylindrical container, comprising an elongated cylindrical container having an upper open end and a lower closed end, a rotatable holder for receiving and maintaining said container in a vertical position, said holder being connected to variable speed rotating means, a stationary cover fitted over the open end of said container, a first conduit fitted through said cover having a jet opening adapted to impinge a liquid stream against the inner wall of said container adjacent its upper open end, a reservoir for containing a washing fluid connected to said first conduit through an intermittently-operating pump, said pump having adjustable means to control the pulse rate of the liquid stream, a second conduit fitted through the said stationary cover and extending to the bottom of said elongated container, and aspirator means for withdrawing excess fluid from the container through said second conduit.

2. The apparatus of claim 1 wherein the aspirator means comprise a spring valve for opening and closing the said second conduit, a waste-receiving flask, said conduit connected to such flask and a vacuum pump for drawing the excess fluid from the elongated container through said second conduit into the waste receiving flask.

3. The apparatus of claim 1 wherein the said first conduit comprises a plurality of branches terminating in spaced jet openings closely adjacent the inner wall of said container near the open upper end thereof.

References Cited in the file of this patent

UNITED STATES PATENTS

| | | |
|---|---|---|
| 893,382 | Sawyer | July 14, 1908 |
| 1,339,930 | Henderson | May 11, 1920 |
| 1,758,537 | Rakestraw | May 13, 1930 |
| 2,078,740 | Stahl | Apr. 27, 1937 |
| 2,240,364 | Kimball | Apr. 29, 1941 |
| 2,454,289 | Neef | Nov. 23, 1948 |
| 2,763,546 | McKenzie | Sept. 18, 1956 |